April 27, 1954 W. P. SCHMITTER 2,676,671
LUBRICATING SYSTEM
Filed June 22, 1949 3 Sheets-Sheet 1

Inventor
WALTER P. SCHMITTER
By Miles Henninger
Attorney

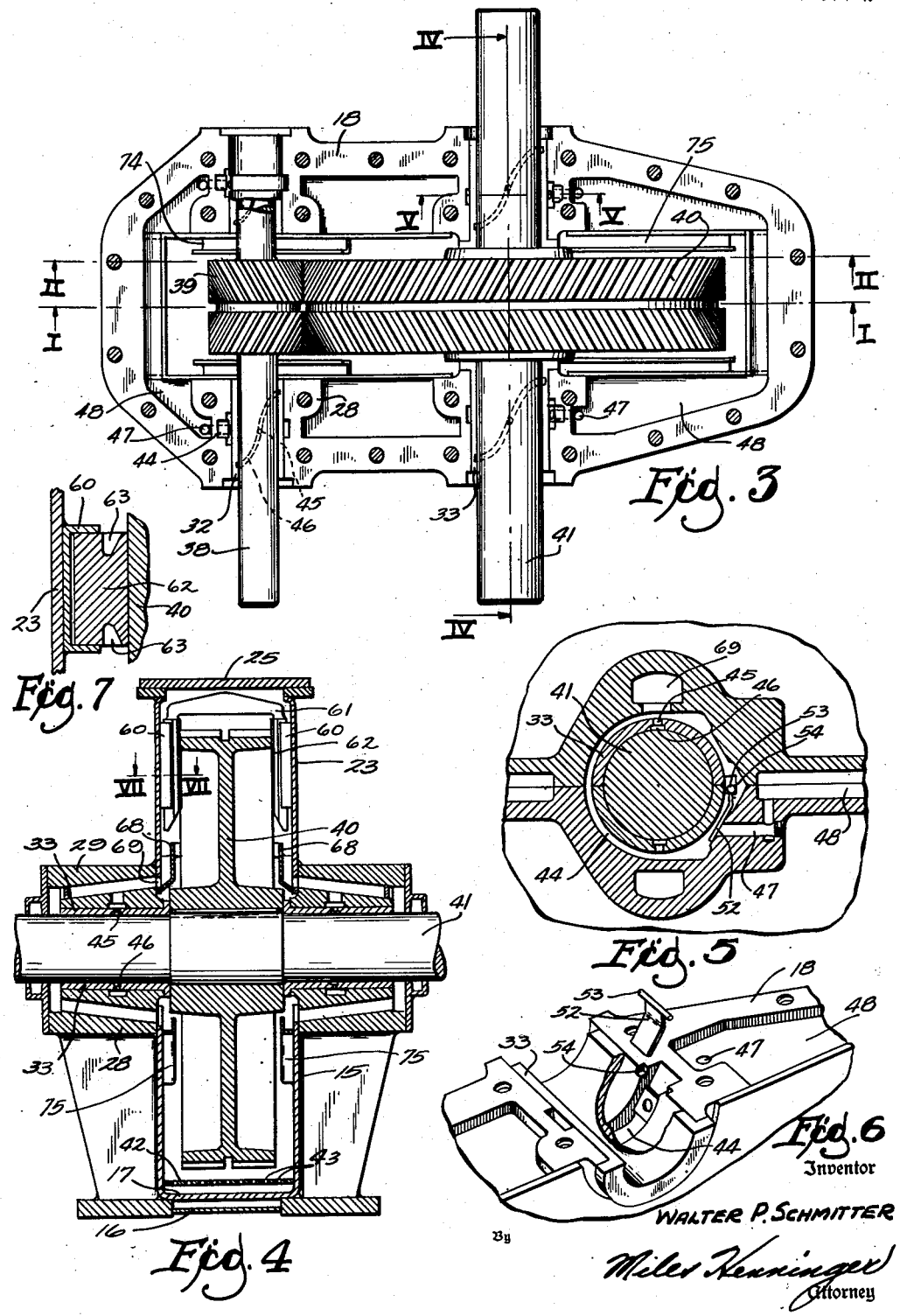

April 27, 1954 W. P. SCHMITTER 2,676,671
LUBRICATING SYSTEM
Filed June 22, 1949 3 Sheets-Sheet 3

Inventor
WALTER P. SCHMITTER
By
Miles Henninger
Attorney

Patented Apr. 27, 1954

2,676,671

UNITED STATES PATENT OFFICE 2,676,671

LUBRICATING SYSTEM

Walter P. Schmitter, Milwaukee, Wis., assignor to The Falk Corporation, Milwaukee, Wis., a corporation of Wisconsin Application June 22, 1949, Serial No. 100,615

4 Claims. (Cl. 184—11)

This invention relates to improvements in lubricating systems and particularly to lubricating systems for gear sets in which the gears themselves, or one of them, causes movement of the lubricant within the gear housing.

It is, therefore, one object of the present invention to provide a lubricating system in which lubricant is supplied to bearings under different pressures dependent on the speed of rotation of the machine parts supported by the bearings.

Another object of the invention is to provide a lubricating system for gear sets in which one of the gears lifts lubricant from a pool in the housing and causes movement of the lubricant through different paths within the housing dependent on the speed of rotation of the gear.

A further object of the invention is to provide a gear set adapted for high-speed operation and formed with a plurality of channels to which lubricant is delivered in quantities dependent on the speed of operation of the gears and from which channels the lubricant is delivered to the several gear shaft bearings under a control dependent on the pressure of the lubricant in such channels.

Objects and advantages other than those above set forth will be apparent from the following description when read in connection with the accompanying drawing in which:

Fig. 3 is a longitudinal cross-section of a gear set embodying the present invention and is taken on a horizontal plane at the joint between the lower and upper portions of the gear set housing.

Fig. 4 is a transverse cross-sectional view on the vertical plane through the line IV—IV of Fig. 3.

Fig. 5 is a cross-sectional view on the vertical plane through the line V—V of Fig. 3 to illustrate one means for controlling the flow of lubricant through one category of the channels in the housing.

Fig. 6 is a perspective view looking into the lower half of one of the gear set bearings.

Fig. 7 is a cross-sectional view on the horizontal plane through line VII—VII of Fig. 4.

Figures 1, 2:
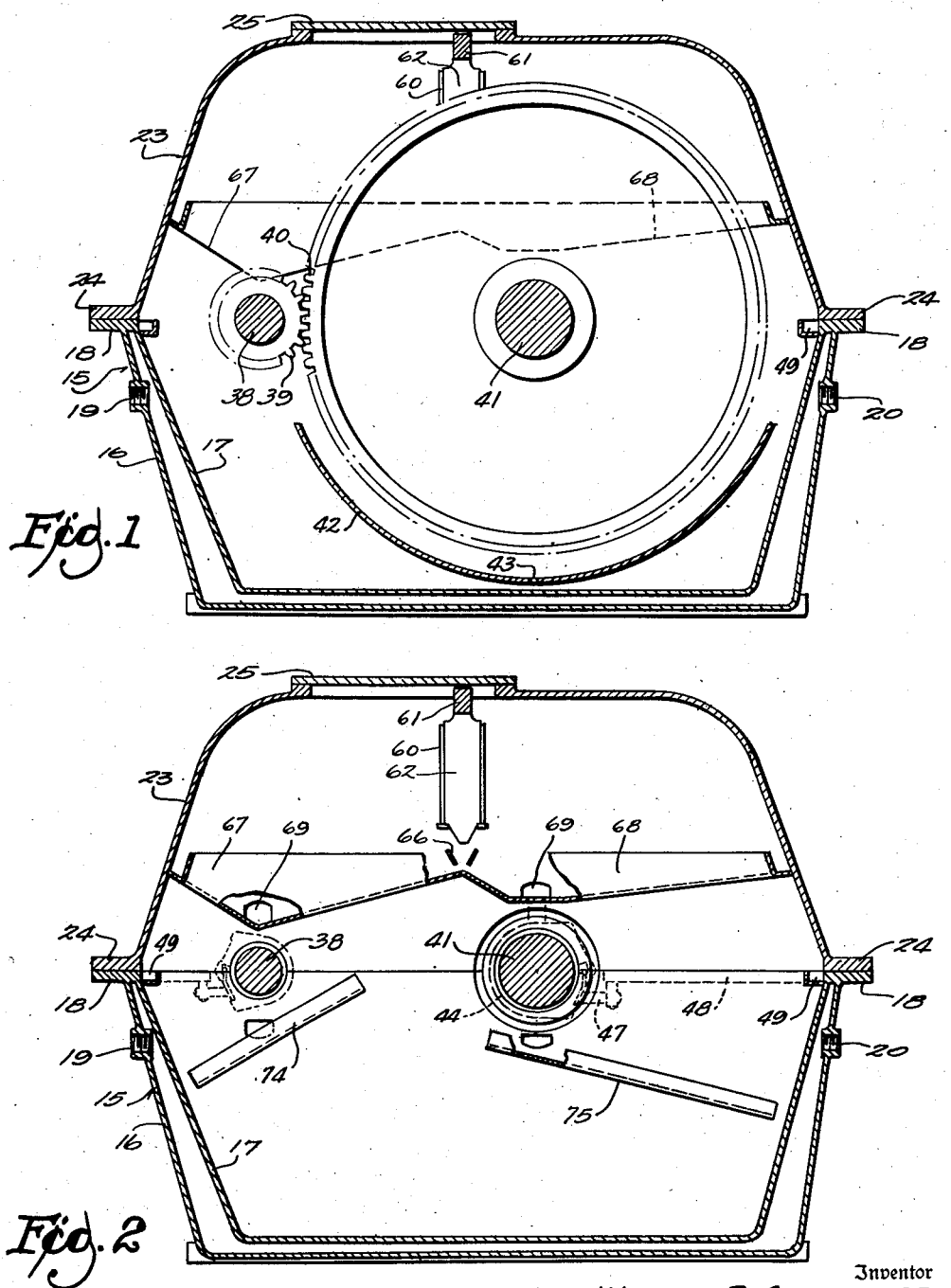
Fig. 1 is a longitudinal cross-sectional view, somewhat diagrammatic, of a gear set embodying the present invention, the section being taken on the vertical plane through the line I—I of Fig. 3.
Fig. 2 is a view similar to Fig. 1 but taken on the vertical plane through line II—II of Fig. 3.

Generally, the present invention provides a gear set comprising a housing for retaining a pool of lubricant and having a plurality of passages formed therein and severally connecting with bearings supported by the housing. A plurality of co-acting gears are mounted in the bearings, one of the gears lifting lubricant from the lubricant pool and throwing some of the lubricant on the housing end walls. Some of the housing passages are connected with troughs mounted on the housing end walls for receiving lubricant thrown on such walls, and form first flow paths for the lubricant to the bearings. Lubricant is also lifted from the lubricant pool by adhesion to the sides of the gear and is wiped therefrom by pads touching on the sides of the gear. The lubricant scraped from the sides of the gear by the wiper pads is discharged into V-shaped troughs extending along the sides of the several gears and co-acting with passages in the housing to provide second paths for the supply of lubricant to the bearings.

The first lubricant flow paths are controlled by a valve which is opened and closed responsive to the difference in pressure of the lubricant in the several flow paths. Such valve may be either of the flap valve type, the piston type or the ball type, the character of the valve used being determined by the space available for the placement of the valve and the cost involved in placing such valve.

The housing also has troughs mounted along the sides of the gears, with one of the troughs adjacent one of the ends of each of the bearings, for receiving the lubricant discharged from the bearings and for delivering such lubricant to one or the other of several housing walls cooled by the circulation of a coolant adjacent such walls.

Referring to the drawings by reference numerals in which like numerals refer to like parts, 15 generally designates the base or lower portion of a housing comprising an outer wall 16 and an inner wall 17 joined by flanges 18, to provide a space for the circulation of a cooling medium therethrough, such coolant being supplied to the space through inlet 19 and discharged therefrom through outlet 20. An upper housing portion generally designated 23 is flanged as at 24 to fit on the lower housing flange and the upper housing is provided with a handhole and cover 25 therefor, for access to the interior of the housing.

The housing flanges 18 and 24 are severally formed to provide bearing supports 28, 29 in which are mounted bearing shells 32, 33 which are similar except for size and which severally receive a shaft. Bearing shells 32 receive a shaft 38 on which is mounted a double helical gear 39 serving as a driving pinion for a double helical driven gear 40 mounted on shaft 41 supported in bearing shells 33. A partial partition 42 of arcuate form, is fixed in the lower housing 15 in spaced relation to the inner wall 17 and to the gear 40, and has apertures 43 through which lubricant is drawn from a pool in the lower housing. The oil pan apertures 43 control the amount of oil into which the gear 40 dips thus reducing agitation and splashing which minimizes temperature rise in the oil and reduces oxidation thereof. The gear 40 throws some of the lubricant lifted thereby, against the interior surface of the upper housing 23.

The bearing supports 28, 29 are formed with conduits as shown at 44 (see Fig. 5) and the bearing shells 32, 33 are apertured as shown at 45 and are internally grooved as shown at 46. Conduits 44 are joined by a passage 47 with a passage 48 formed by co-acting channels in the housing flanges 18 and 24 and the housing walls on which such flanges are fixed. Lubricant thrown on the wall of the upper housing drains down along the wall surface and is collected in one of the several troughs 49 fixed on the end walls of the lower housing 15 adjacent the flange 18 thereof. The lubricant collecting troughs 49 discharge into the flange channels 48 and the lubricant flows therefrom into the passages 47 from which it discharges into the bearing support conduits 44, such composite passages being herein designated as first flow paths. The flow through such first flow path is controlled by valve means shown in Fig. 5 as a flap valve 52 mounted on a pivot 53 resting in notches 54 in the bearing supports. It will be understood that each of the bearing supports is provided with a lubricant first flow path similar to that above described and that the flow of lubricant through each such path is controlled by similar means, the operation of such means being described hereinafter.

By reference to Figs. 3 and 4, it will be seen that the housing halves 15 and 23 fit relatively closely about gears 39 and 40, the gear 40 being the only gear dipping into the lubricant pool and lifting the lubricant therefrom. Such lifting of lubricant occurs on the teeth of the gear 40 which throw the lubricant against the housing end walls, and also occurs on the side surfaces of such gear due to adhesion of the lubricant on such surface. Means are provided for wiping the lubricant from the side surfaces of the gear 40 and for delivering such lubricant to second flow paths for supply to the bearings. The wiping means (see especially Figs. 2, 4 and 7) comprises channel-like receptacles 60 mounted in vertical position on the side walls of the housing half 23 at locations displaced in the direction of rotation from the vertical axis through the gear 40. U-shaped wiper holders generally designated 61 severally receive relatively soft metallic lubricant wiping pads 62 against which the sides of the gear 40 may run and the wiping pads have grooves 63 for collecting and directing flow of oil from the pads.

The lower ends of the wiper holders 61 and the wipers 62 are pointed to deliver the lubricant scraped off sides of the gear 40, between baffle plates 66 for guiding the lubricant dropping from the wipers onto second flow paths for receiving such lubricant. Such second flow paths severally comprise V-shaped troughs 67 and 68 having the adjacent ends joined immediately below the baffle plates 66 to provide a flow-dividing high point, and having the channel low points severally connected with passages 69 in the bearing supports, the passages 69 being connected with the housing conduits 44 about the bearings.

In operation, so long as gear 40 rotates at a slow speed sufficient lubricant for the bearings 32, 33 is thrown on the end walls of the housing portion 23 and drains down such walls into the first flow paths comprising the troughs 49, the flange channels 48, the bearing support passages 47 and the bearing support conduits 44 and is drawn from there into the bearing shells. A sufficient hydraulic head is built up in such first flow paths to open the flow control means 52 and to allow substantially unimpeded flow of oil through such paths. The oil flowing through the bearing apertures 45 and the grooves 46 discharges from the end of the bearings into spouts 74, 75 (see Figs. 2 and 4) adjacent the sides of the gears 39 and 40. Oil is discharged from such spouts onto surfaces of the inner wall 17 of the housing portion 15 where the oil is cooled as it flows down such walls into the lubricant pool in the lower housing. It will be noted that the spout 74 extends sufficiently beyond the meshing point of the gears to receive the oil forced from between the gear teeth by such meshing.

When the gears are rotated at high speeds, it is desirable that the flow of lubricant to the bearings be under higher pressure than at the lower speed of the gears. At all speeds the sides of the gears carry oil which is scraped off by the wipers 62 but at high speeds a sufficient quantity of oil is so carried to completely fill the second flow paths and to build up considerable hydraulic head therein, such flow paths comprising the V-troughs 67, 68, the bearing support passages 69 and the bearing grooves 44. As soon as the pressure in the second flow paths is higher than in the first flow paths, such higher pressure closes the flow control valves 52 and all of the lubricant to the bearings is thereafter supplied from the second flow paths so long as the gears are at a sufficiently high speed to maintain the higher pressure in such paths. The pressure of lubricant supplied to the bearings is, therefore, directly dependent on the speed of operation of the gears.

During the high speed gear operation, the first flow paths are filled with oil (until the troughs 49 overflow) thus providing a maximum head in such flow paths, which is available if the gears slow down and thus reduce the pressure in the second flow paths slightly below that of the first flow paths, whereupon the valves 52 reopen. It will be understood that the second flow paths contain some lubricant even when the valves reopen and that such lubricant is replenished to some degree even during the slow speed operation of the gears. Hence, both flow paths furnish lubricant to the bearings during the period when the pressures therein are substantially equal. By suitable proportioning of the several flow paths, it is possible to predetermine within close limits, the speed at which the flow control valves will close and re-open.

Figure 8:
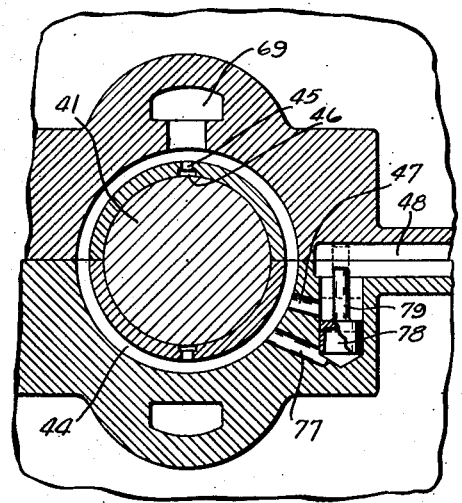
Fig. 8 is a view similar to Fig. 5, of a second form of lubricant flow control means.
Figure 9:
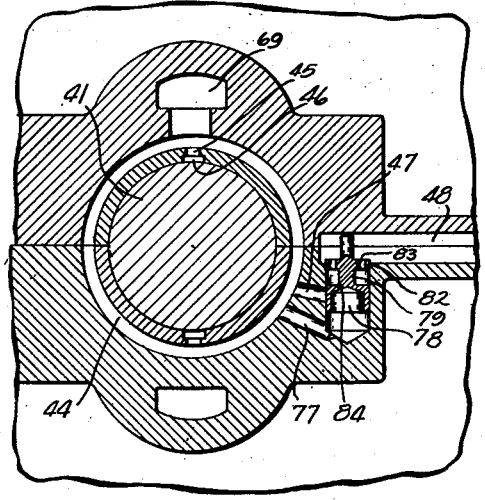
Fig. 9 is a view similar to Fig. 5, of a third form of lubricant flow control means.
Figure 10:
Fig. 10 is a perspective view of the control means shown assembled in Fig. 9.

Instead of using a flap type valve for the flow control as heretofore described, a cupped piston type valve may be used with another passage 77 formed in the bearing supports as shown in Figs. 8, 9 and 10. In Fig. 10 the valve comprises the cup 78 with a stem 79 and the valve is guided in its movement by the various parts of the passage enclosing such valve. The pressure in the bearing support groove 44 constantly acts through the passage 77 and inside the cup 78 so that an increase of pressure in the second flow paths will finally lift the valve and close off the passage 47. It will be noted that closure of passage 47 proceeds proportionally as the pressure in the second flow paths increases so that both flow paths are in use for the maximum length of time.

The structure shown in Figs. 9 and 10 is similar to that of Fig. 8 excepting that the stem of the valve is now provided with a flange 82 for guiding valve movement, the flange being apertured as at 83 to permit flow of oil to the passage 47. In the present structure, the valve cup 78 is also apertured at 84 to permit venting any gases which might collect in the cup and thus vary the responsiveness of the cup to the pressures acting thereon.

Figure 11:
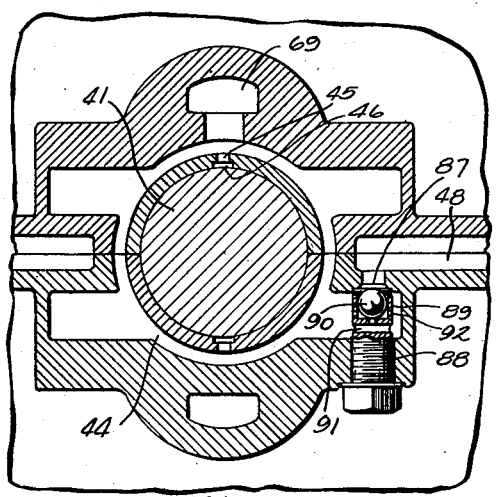
Fig. 11 is a view similar to Fig. 5, of a fourth form of lubricant flow control means.
Figure 12:
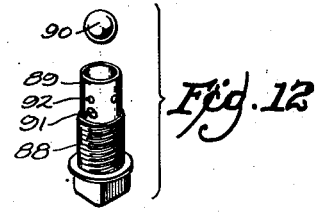
Fig. 12 is a perspective view of the flow control means shown in section in Fig. 11.

In the structure shown in Figs. 11 and 12, the passage 47 is omitted and the lower housing flange is apertured at 87 to provide a spherical seat. An aperture through the bearing support then receives a plug 88 with the end thereof formed as a cage 89 to receive a ball 90. The plug is apertured at 91 for the free passage of oil about the ball cage and the ball cage itself is apertured at 92 for the free passage of oil about the ball valve. The present construction has the advantage of minimum cost in providing for the flow control with a high degree of valve sensitivity.

It will thus be seen that the present invention provides a simple and inexpensive means for lubricating bearings at different rates dependent on the speed of operation of the device and hence on the need for such lubrication. In the present use of the invention, the structure is particularly simple and provides adequate lubrication for gear operation for both low and high speeds dependent on the speed of rotation of the "pumping" gear. In devices other than gear sets, whether the lubricant is moved by an element of the device or by a pump, it is possible to so proportion the passages and the control valves as to obtain precisely the lubricant pressure best suited for given operating speeds.

Although but four embodiments of the present invention have been illustrated and described, it will be apparent to those skilled in the art that various changes and modifications may be made therein without departing from the spirit of the invention or from the scope of the appended claims.

I claim:

1. In a lubricant system for a gear set, a housing retaining a pool of lubricant and having a plurality of passages therein, bearings supported by the housing, a gear mounted in the bearings and lifting lubricant from the pool, the gear throwing some of the lubricant on some of the housing walls, the housing passages forming portions of separate first and second paths for lubricant flow from the housing walls to the bearings, means for wiping some of the lubricant from the gear, means within the housing for receiving lubricant from the wiping means and coacting with some of the housing passages in forming second paths for lubricant flow to the bearings, the two flow paths being at different heights relative to the bearings for collecting and supplying lubricant to the bearings at different pressures, and means in the first flow paths for controlling lubricant flow therethrough responsive to difference in pressure of the lubricant in the first and second flow paths.

2. In a lubricating system for a gear set, a housing retaining a pool of lubricant, bearings supported by the housing, a gear mounted in the bearings and lifting lubricant from the pool, the gear throwing some of the lubricant on a housing end wall, the housing having passages forming portions of separate first and second paths for lubricant flow to the bearings, means for wiping some of the lubricant from the gear, means within the housing for receiving lubricant from the wiping means and coacting with some of the housing passages for forming second paths for lubricant flow to the bearings, the two flow paths being at different heights relative to the bearings for collecting and supplying lubricant to the bearings at different pressures, and pressure responsive valves mounted in the first flow paths for closing such paths upon rise in pressure in the second flow paths above that of the first flow paths.

3. In a lubricating system for a gear set, a housing retaining a pool of lubricant and having a plurality of passages therein, bearings supported by the housing, a gear mounted in the bearings to lift lubricant from the pool and to throw some of the lubricant on an end wall of the housing, means mounted on the housing end wall for receiving the lubricant thrown thereon and coacting with some of the housing passages in forming first lubricant flow paths leading to the bearings, pads on the housing side walls and extending vertically thereof for contact with portions of the sides of the gear, troughs mounted on the housing side walls and coacting with others of the housing passages in forming second lubricant flow paths to the bearings, the second flow paths being independent of the first flow paths, the two flow paths being at different heights relative to the bearings for collecting and supplying lubricant to the bearings at different pressures, and valves severally mounted in and closing the first flow paths upon the occurrence of higher pressures in the second flow paths than in the first flow paths.

4. In a lubricating system for a gear set, a housing retaining liquid lubricant and having a plurality of passages therein, bearings supported by the housing, the housing having passages about each bearing for conducting a supply of lubricant to the bearings, a gear mounted in the bearings to lift lubricant and to throw some of the lubricant on an end wall of the housing, means mounted on the housing end wall for receiving lubricant thrown thereon and coacting with some of the first said housing passages and with the second said housing passages for forming first flow paths for lubricant supply to the bearings, means severally mounted on the housing side walls for contact with portions of the sides of the gear, troughs mounted on the housing side wall above the means receiving lubricant thrown from the gear and coacting with others of the housing passages in forming second flow paths for lubricant supply to the bearings, the flow paths being severally joined to the lubricant supply passages about the bearings with the juncture therewith of the second flow paths located above the juncture therewith of the first flow paths, and valves severally mounted at the junctures of the first flow paths with the lubricant supply passages about the bearings for closing the first flow paths upon the occurrence of higher pressure of the lubricant in the second flow paths than the lubricant in the first flow paths.

References Cited in the file of this patent

UNITED STATES PATENTS

| Number | Name | Date |
|---|---|---|
| 706,120 | Short | Aug. 5, 1902 |
| 1,639,680 | Acker | Aug. 23, 1927 |
| 1,971,781 | Henderson | Aug. 28, 1934 |
| 1,972,911 | Acker | Sept. 11, 1934 |
| 1,995,288 | Acker | Mar. 26, 1935 |
| 2,391,186 | Noble | Dec. 18, 1945 |
| 2,536,385 | Miller | Jan. 2, 1951 |
| 2,548,805 | Moir | Apr. 10, 1951 |

FOREIGN PATENTS

| Number | Country | Date |
|---|---|---|
| 575,721 | Great Britain | Mar. 1, 1946 |